United States Patent
Takada et al.

(10) Patent No.: US 8,233,219 B2
(45) Date of Patent: Jul. 31, 2012

(54) OPTICAL MULTILAYER THIN-FILM FILTERS AND METHODS FOR MANUFACTURING SAME

(75) Inventors: Motoo Takada, Saitama (JP); Shinya Kikegawa, Saitama (JP); Toshimasa Nishi, Saitama (JP); Hiroto Ishikawa, Saitama (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 660 days.

(21) Appl. No.: 12/330,421

(22) Filed: Dec. 8, 2008

(65) Prior Publication Data

US 2009/0153971 A1    Jun. 18, 2009

(30) Foreign Application Priority Data

Dec. 17, 2007   (JP) .................. 2007-324227

(51) Int. Cl.
  *G02B 1/10*    (2006.01)
  *G02B 5/28*    (2006.01)
  *H04N 5/225*   (2006.01)
(52) U.S. Cl. ......... 359/588; 359/587; 359/590; 348/342
(58) Field of Classification Search .................. 359/586, 359/587, 588, 590; 348/342
  See application file for complete search history.

(56) References Cited

U.S. PATENT DOCUMENTS

| | | | | |
|---|---|---|---|---|
| 5,688,608 | A * | 11/1997 | Tsai et al. | 428/696 |
| 7,227,691 | B2 * | 6/2007 | Kamikawa | 359/588 |
| 2004/0027706 | A1 | 2/2004 | Nakajima et al. | |
| 2006/0039062 | A1 * | 2/2006 | Horikoshi | 359/359 |

FOREIGN PATENT DOCUMENTS

| | | |
|---|---|---|
| JP | 10-123303 | 5/1998 |
| JP | 2006-249499 | 9/2006 |
| JP | 2007-193264 | 8/2007 |
| JP | 2007-298951 | 11/2007 |
| JP | 2007-316107 | 12/2007 |

* cited by examiner

*Primary Examiner* — Alessandro Amari
(74) *Attorney, Agent, or Firm* — Klarquist Sparkman, LLP

(57) ABSTRACT

Optical multilayer thin-film filters (OMTFFs) are disclosed. An exemplary filter includes a transparent substrate, a multilayer film (MF) on a surface of the substrate, and a top layer. The MF is of alternatingly laminated layers of a high-refractive-index (HRI) material and a low-refractive-index (LRI) material. The top layer is on an uppermost layer of the MF and is of a material having atoms of lower atomic weight than atoms of either the HRI or LRI materials. The OMTFFs are made in a vacuum environment by alternatingly laminating respective thin films of the HRI and LRI materials on the substrate. The top layer is formed on the MF. Between forming the MF and top layer is a suppression step in which the newly formed MF is exposed to moisture by briefly venting the vacuum to atmosphere. The moisture inhibits migration of the low-molecular-weight atoms into the HRI and LRI materials.

17 Claims, 5 Drawing Sheets

OPTICAL MULTILAYER THIN-FILM FILTERS AND METHODS FOR MANUFACTURING SAME

CROSS-REFERENCE TO RELATED APPLICATIONS

This application claims priority to, and the benefit of, Japan Patent Application No. 2007-324227, filed on Dec. 17, 2007, in the Japan Patent Office, the disclosure of which is incorporated herein by reference in its entirety.

FIELD

This disclosure pertains to, inter alia, multilayer-film optical filters that include a transmissive, surficial metal film to reduce or eliminate accumulation of charges on the filter. Also disclosed are methods for making such multilayer-film optical filters, including formation of the metal film on a surface of an OLPF (optical low-pass filter) comprising a substrate such as quartz crystal.

DESCRIPTION OF THE RELATED ART

Conventional digital imaging devices such as digital still cameras and digital video cameras include a CCD (charge-coupled device) or CMOS (complementary metal-oxide semiconductor) solid-state image sensor. Placed on or near the image-receiving surface of the image sensor is an optical low-pass filter (OLPF), comprising a glass or quartz crystal substrate. The OLPF passes lower-frequency light components and blocks (e.g., by reflection) higher-frequency light components. Using an OLPF, fine patterns mainly having large luminance differences can be defocused. For example, the solid-state image sensor tends to generate an interference pattern (moiré pattern) whenever the image includes ordered fine patterns. The sensor also tends to generate color moiré patterns that add unwanted color to the detected image when the photographic subject has large luminance differences such as hair illuminated by backlight. The OLPF removes these interference patterns (moiré patterns or color moiré patterns) by defocusing the image and blurring the edges of the image.

Placed on or near the front or rear surface of a conventional OLPF is an optical multilayer thin-film filter (OMTFF). The OMTFF passes only optical wavelengths in a range sensed by the human eye and blocks transmission of infrared radiation. Thus, the wavelength-detection range of the solid-state image sensor, which has high sensitivity to infrared radiation, is brought closer to actual human vision. Because the substrate of the OLPF is made of glass or quartz crystal, it tends to become charged by its own piezoelectric effect. If the OLPF becomes electrically charged, the OMTFF also acquires a surface charge, which causes the OMTFF to attract and adsorb dust particles. Hence, especially whenever interchangeable lenses of a digital single-lens reflex camera are changed, for example, the filter is exposed to outside air and adsorbs dust from the air. The adsorbed dust also tends to be charged, making it difficult to remove the dust from the filter.

Japan Unexamined Patent Publication No. 2007-298951 discusses a method for removing static charge from an OMTFF by depositing a surficial layer of ITO (indium tin oxide) on the filter to provide the filter surface with a charge-conducting material. ITO transmits 90% of incident optical wavelengths, so the method does not change the optical characteristics of the filter in any significant way.

However, strictly speaking, the method of depositing ITO tends to contaminate the interior of the deposited multilayer-film layers. The contamination tends to degrade the optical performance of the OMTFF. Contamination arises because ITO is deposited on the surface of the multilayer film after forming the multilayer film. The multilayer film is formed by alternatingly depositing layers of a first dielectric film having high refractive index and layers of a second dielectric film having low refractive index. Also, indium (In) is a rare metal; since ITO is used for liquid-crystal panels and flat-panel displays (FPDs) such as organic EL, its anticipated price escalation and deficiency of supply in the future is a concern.

The current invention prevents accumulation of static charges on the OLPF by providing the associated OMTFF with a charged-conductive surface, but without having to use ITO.

SUMMARY

According to a first aspect of the invention, optical multilayer thin-film filters (OMTFFs) having particular configurations are provided. An embodiment of the OMTFF comprises a transparent substrate and a highly refractive multilayer film comprising alternatingly laminated thin layers of a high-refractive-index material and of a low-refractive-index material on a surface of the substrate. Formed on the multilayer film is a layer of a charge-conductive material having lower atomic weight than the high-refractive-index and low-refractive-index materials. An OMTFF having such a configuration provides good charge dissipation without having to use ITO. Since the charge-conductive layer readily conducts static charges away from the optical multilayer film, adsorption of dust onto the layer is at least substantially inhibited.

The OMTFF can be used in combination with an infrared-blocking filter that transmits visible light and reflects or otherwise blocks transmission of infrared light. The OMTFF also confers an antistatic property to the infrared-blocking filter; when the filters are used in conjunction with an image-forming and recording device such as a camera, dust does not adversely affect performance of the image-forming and recording device.

The high- and low-refractive-index thin films desirably are layers of respective oxides. The "final" or uppermost layer, formed atop the multilayer film, is not an oxide. The final layer is formed in a manner resulting in formation of a metal film. Some of the material of the final layer penetrates into the upper high- and low-refractive-index thin films, thereby providing good bonding of the metal film to the multilayer film and good removal of charges from the filter. Some of the material of the final layer reacts with oxygen atoms in the oxides of the high- and low-refractive-index films. Thus, some of the deposited material of the final layer becomes oxides of the metal of which the final layer is formed. This further facilitates the antistatic property of the filter.

The high-refractive-index layers desirably comprise any of $TiO_2$, $Nb_2O_5$, and $Ta_2O_5$, or of compound oxides based on one or more of $TiO_2$, $Nb_2O_5$, and $Ta_2O_5$. The low-refractive-index layers desirably comprise either $SiO_2$ or $Bi_2O_3$, or of compound oxides based on one or more of $La_2O_3$ and $Al_2O_3$.

In many embodiments the final layer is formed from $MgF_2$ or LiF. $MgF_2$ and LiF have low molecular weights so that they can diffuse into the material of the high- and low-refractive-index films, particularly the upper films in the multilayer structure.

In many embodiments the transparent substrate is glass or quartz crystal. Both materials are suitable for use in making an optical filter.

According to another aspect of the invention, methods are provided for manufacturing an OMTFF. An embodiment of the method includes a first deposition step, in which alternating thin layers of a high-refractive-index material and of a low-refractive-index material are deposited superposedly on a transparent substrate. Thus, in the first deposition step, a multilayer film is formed. In a second deposition step a "top" layer is formed, atop the multilayer film, of a material having a lower molecular weight than either the high- or low-refractive-index materials. In a suppression step the amount of lower-molecular-weight material allowed to diffuse into the high- and low-refractive-index materials is controlled. By appropriate control being exercised in the suppression step, the deposited low-molecular-weight material is substantially prevented from entering the high- and low-refractive-index materials easily, allowing a practical OMTFF to be manufactured.

The suppression step can include, for example, establishing conditions in which the high- and low-refractive-index materials can absorb moisture. Moisture absorption by the high- and low-refractive-index materials largely prevents the low-molecular-weight material of the top layer from entering the high- and low-refractive-index materials.

Desirably, in the first deposition step, the high-refractive-index layers and low-refractive-index layers of the multilayer film are formed alternatingly by vacuum deposition in a vacuum chamber. Then, in a suppression step after the first deposition step, the vacuum chamber is vented to atmosphere. In the subsequent second deposition step, the vacuum chamber is returned to a vacuum state before commencing deposition of the low-molecular-weight material to form the top layer. By venting the chamber to atmosphere during the suppression step, moisture contained in the air is absorbed in the layers of high- and low-refractive-index materials. With this simple venting step an OMTFF is fabricated that has high conductivity.

Various embodiments of an OMTFF include a metal film formed without having to use a transparent electrode material such as ITO in the top (also called "final") layer. Thus, the surface of the OMTFF effectively eliminates static from the OLPF with which the OMTFF is often used.

DETAILED DESCRIPTION

Figure 2:
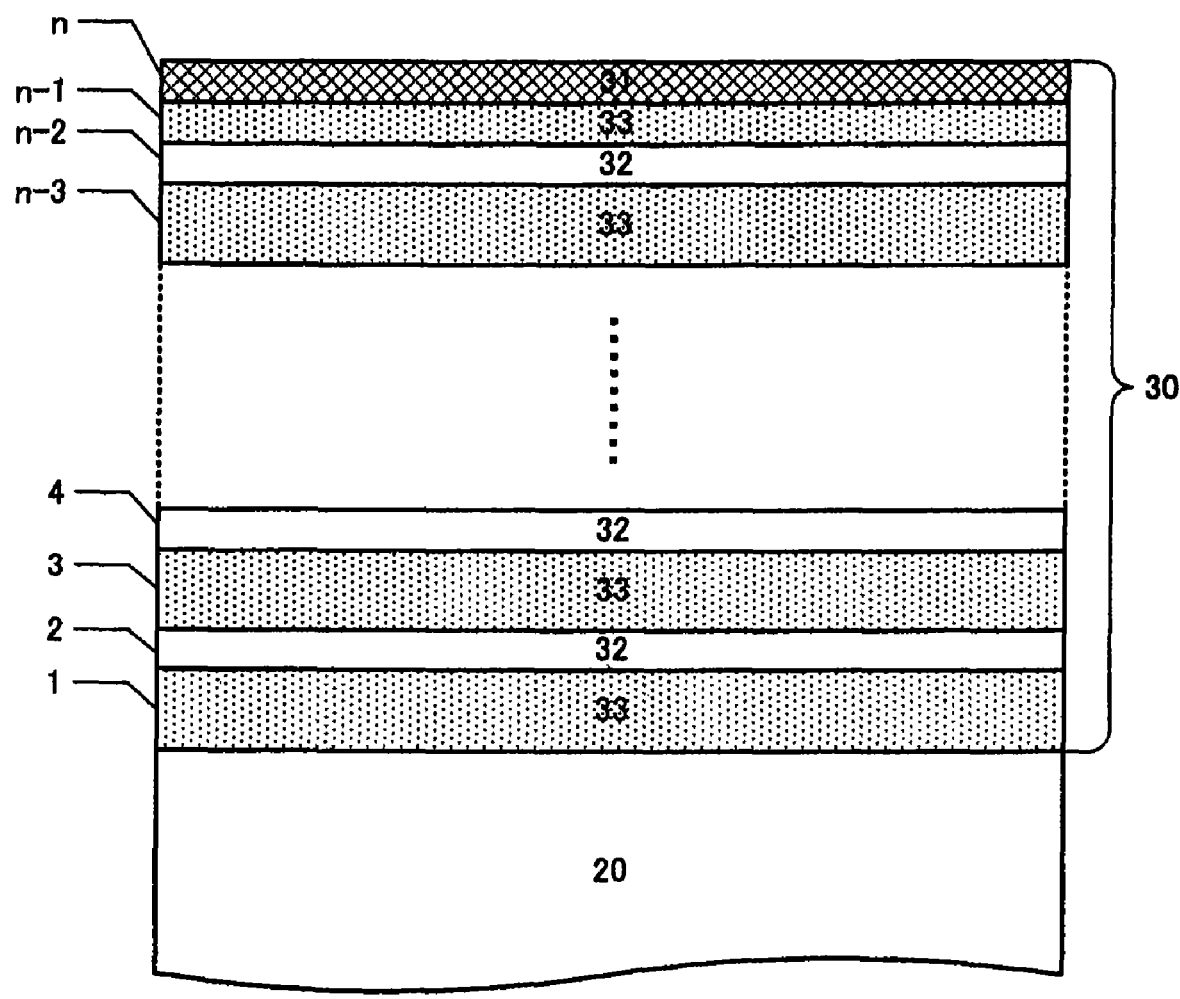
FIG. 2 is a schematic elevational view of a quartz-crystal substrate 20 on which multiple thin layers of high-refractive-index material and low-refractive-index material are laminated in an alternating manner to form a multilayer film.

Referring first to FIG. 2, an embodiment of an optical multilayer thin-film filter (OMTFF) 30 exhibiting a charge-eliminating function is formed by laminating, in an alternating manner, respective thin films of: (a) an oxide having a high refractive index and (b) an oxide having low refractive index. The multilayer film is formed from multiple superposed layer pairs of these materials. The resulting multilayer film has a top (uppermost) surface on which a layer of a non-oxide having low refractive index is formed. For example, titanium dioxide 32 ($TiO_2$) can be used as the high-refractive-index material, and silicon dioxide 33 ($SiO_2$) can be used as the low-refractive-index material. For effective blocking of incident infrared radiation, the multilayer film includes 20 to 60 layer pairs of the high-refractive-index material 32 and low-refractive-index material 33. A "final" (top) layer of magnesium fluoride 31 ($MgF_2$) is formed on the multilayer film. The top layer 31 removes and prevents charge accumulations on the filter 30.

Incident light on the OMTFF undergoes multiple reflections between the surfaces of the layers of the multilayer film. Constructive interference of multiply reflected wavefronts produces a transmission maximum for the desired wavelength(s), resulting in a transmission-pass band. Destructive interference reduces transmission of undesired wavelength(s) to nearly zero, resulting in a reflection band(s). Therefore, it will be appreciated that the layers of the multilayer film must be made while exercising tight control of the index of refraction and physical thickness of each layer.

Method for Manufacturing Optical Multilayer Thin-Film Filter

Figure 1:
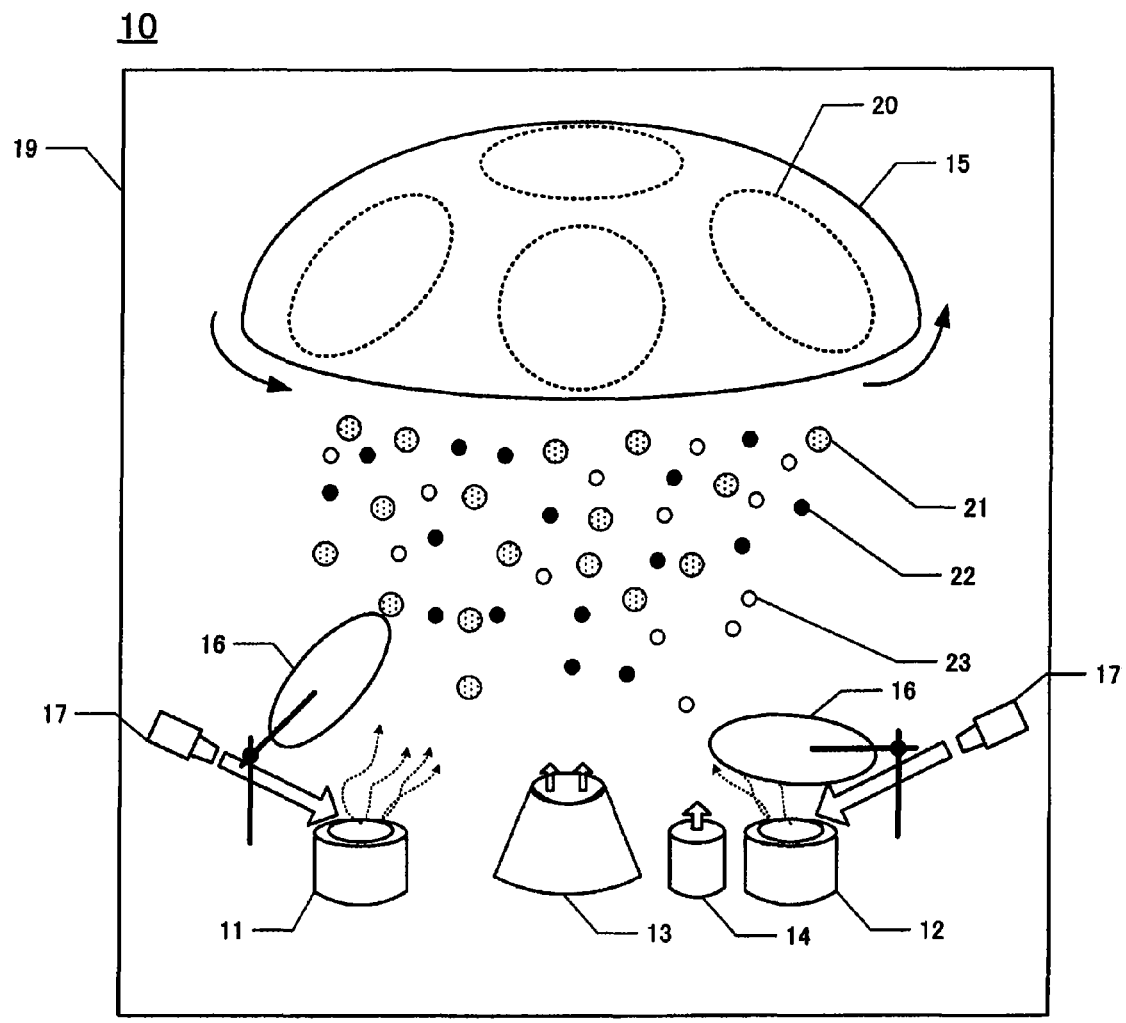
FIG. 1 is a perspective view of an ion-assisted deposition apparatus used for fabricating various embodiments of optical multilayer thin-film filters.

The optical multilayer thin-film filter (OMTFF) 30 desirably has a stable thin-film structure having optical characteristics that are unaffected by changes of temperature or humidity. To such end, the OMTFF 30 desirably is formed using IAD (Ion-Assisted Deposition). A general configuration of an apparatus 10 for performing IAD is shown in FIG. 1. In the IAD apparatus 10, deposition material (from which a layer is to be formed on a substrate 20) is evaporated in a vacuum chamber 19 and directed toward the substrate 20 on which the evaporated material becomes deposited.

The IAD apparatus 10 includes an ion source 13 located inside the vacuum chamber 19. During operation the chamber 19 is evacuated to an appropriate vacuum level. The ion source 13 is an important feature for performing "ion-assisted" deposition. Ions 22 from the ion source 13 impart kinetic energy to particles of vacuum-evaporated material produced in the chamber 19. The ions 22 also facilitate formation of amorphous layers on the substrate 20 rather than crystalline layers. Forming amorphous layers enhances the density of the layers so that the layers exhibit less wavelength shift in air.

In the IAD apparatus 10 the ions 22 (being positively charged) could cause charge accumulation in and on the thin layers being formed on the substrate 20. To prevent charge accumulation, electrons 23 (having negative charge) are also irradiated in the chamber 19 from a "charge-neutralizing device" 14.

For supplying material for deposition of the respective layers of the multilayer film, the IAD apparatus 10 includes a first evaporation source 11 and a second evaporation source 12. When bombarded by electrons from a respective electron source 17, the first evaporation source 11 releases, in the vacuum environment in the chamber 19, vaporized material having high refractive index. Similarly, when bombarded by electrons from a respective electron source 17, the second evaporation source 12 releases, in the vacuum environment in the chamber 19, vaporized material having low refractive index. Items 22 in the figure represent vaporized material. A respective shutter 16 is arranged above each evaporation source 11, 12 so that a selected one of the sources 11, 12 is releasing vaporized material at any given time. A substrate dome 15 is arranged above the shutters 16. One or more substrates 20 (made of quartz crystal or other suitable substrate material) are mounted inside the substrate dome 15. By rotating the base dome 15 during production of vaporized layer-forming material in the chamber 19, the particles 22 of vaporized material are deposited evenly on the crystal substrate 20.

A first deposition step is directed to forming the alternating layers of the multi-layer film on a surface of each of the substrates 20. The IAD apparatus 10 irradiates electrons from the respective electron source (electron "gun") 17 to the first evaporation source 11, and radiates electrons from the respective electron source 17 to the second evaporation source 12. From the electron bombardments, the respective materials of each evaporating source 11, 12 are evaporated in the chamber 19. Releasing evaporated material from either source 11, 12 is controlled by opening or closing the respective shutters 16 for respective designated times. To form alternating layers on the substrates 20, the shutters 16 are opened and closed in an alternating manner for respective amounts of time. Thus, layers of the material of the first evaporation source 11 and layers of the material of the second evaporation source 12 are deposited alternatingly with designated respective thicknesses on the substrates 20. For example, the first evaporation source 11 is titanium for forming titanium dioxide layers 32, and the second evaporation source 12 is silicon for forming silicon dioxide layers 33. The corresponding oxides are formed in the chamber 19 in the presence of oxygen gas 21 introduced into the chamber.

A second deposition step is performed after completion of the multilayer film in the first deposition step. For the second deposition step a third evaporation source (not shown) is arranged in the chamber 19. In one embodiment the third evaporation source contains magnesium fluoride 31, which is evaporated by irradiating electrons on it from a respective electric gun 17. Thus, a top film is formed on the multilayer film on the substrates 20.

In the first deposition step, during formation of the multilayer film, the vacuum chamber 19 of the IAD apparatus maintains the required vacuum level(s) as alternating layers of titanium dioxide 32 and silicon dioxide 33 are formed. After completing the first deposition step, but before commencing the second deposition step, a "suppression step" can be performed. During the suppression step the vacuum chamber 19 of the IAD apparatus is vented to atmosphere. Then the vacuum chamber is re-evacuated before commencing the second deposition step. The vacuum level is appropriate for forming the "top" layer of magnesium fluoride 31. By momentarily venting the vacuum chamber 19 to atmosphere, moisture (in the form of water vapor) in the air enters the vacuum chamber 19. Some of this moisture is absorbed by the substrates 20 attached to the substrate dome 15. More specifically, venting the vacuum chamber 19 to atmosphere after the first deposition step allows moisture to enter the chamber and contact the layers of titanium dioxide and silica dioxide formed during the first deposition step. The moisture also limits the amount of magnesium (Mg), in the second deposition step, allowed to penetrate into the layers of titanium dioxide and silicon dioxide.

Configuration of the Optical Multilayer-Film Filter

The light-transmittance of an OMTFF 30 is similar to the transmittance of a transparent thin film. The transmittance of a thin film is defined as the product of the index of refraction and the physical thickness of the thin film. Hence, the index of refraction, thickness, and number of laminations are selected and controlled to achieve a desired reflectivity for incident infrared radiation. Generally, the thickness is established as ¼ the wavelength of incident light to maximize refraction or transmittance.

FIG. 2 schematically depicts multiple thin films laminated on a crystal substrate 20 by the IAD apparatus 10. To reflect incident infrared radiation, each titanium dioxide layer 32 (a transparent thin film having a high index of refraction) is deposited as a first layer, and each silicon dioxide layer 33 (a transparent thin film having a low index of refraction) is deposited as a second layer. The layers are laminated alternatingly (1, 2, 3, 4, . . . , n−3, n−2, n−1) so that multiple layer pairs are formed. Each layer pair comprises a respective first layer and a respective second layer. As a "final" layer (layer n), a layer of magnesium fluoride 31, having a low index of refraction, is laminated on the n−1 layer. The n−1 layer is a layer of silicon dioxide 33 having low index of refraction. Thus, the n layer and n−1 layer are both made of materials having low respective indices of refraction, and collectively form a thin film comprising two different materials. The number of layers of silicon dioxide 33 and of titanium dioxide 32 is about 20 to 60 layers.

The magnesium (Mg) in the "final" magnesium fluoride layer (layer n) 31 has a smaller atomic radius than either the low-refractive-index material or the high-refractive-index material. The atomic weight of Mg is 24.305, of fluorine (F) is 18.998, of silicon (Si) is 28.085, and of titanium (Ti) is 47.867. Also, Mg combines with oxygen easily. Formation of the final layer 31 includes some diffusion of Mg into the underlying silicon dioxide layer 33. But, the amount of Mg actually penetrating and the depth of penetration desirably are controlled. As Mg enters the silicon dioxide layer 33, it forms magnesium oxide (MgO) by combining with oxygen in the layer 33. Some Mg also enters the titanium dioxide layer 32 beneath the uppermost silicon dioxide layer 33, and forms titanium monoxide (TiO) by combining with oxygen in the layer.

Both magnesium oxide and titanium monoxide have electrical conductivity in the manner of metal films. By forming the magnesium fluoride layer 31 as the "final" layer, a metal top film is essentially formed on the top surface of the OMTFF 30 that can eliminate charge accumulation.

Figure 3:
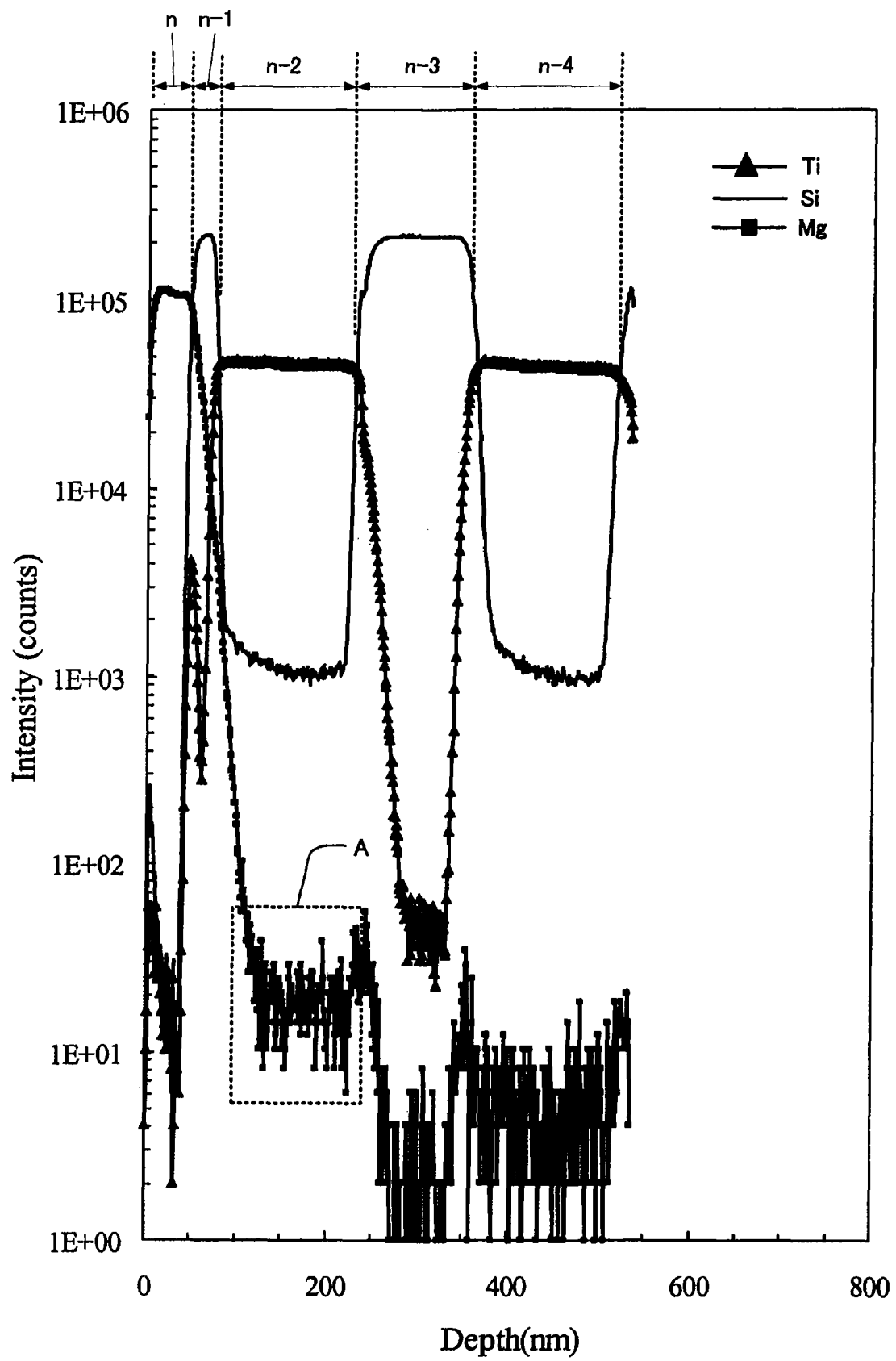
FIG. 3 is a graph of intensity versus depth exhibited by the upper layers of an embodiment of an optical multilayer thin-film filter.

FIG. 3 is a graph showing that, in the OMTFF 30, some magnesium (Mg) from layer n has entered the top titanium dioxide layer n−1. The X-axis is depth from the surface of the OMTFF 30, and the Y-axis is intensity of each element by "counts" (essentially a measure of concentration). Note that fluorine (F) and oxygen (O) are not shown in order to make the graph comprehensible.

As understood from the graph, magnesium (Mg) in layer n shows a peak near a depth of 50 nm from the surface of the OMTFF 30. The intensity of Mg declines substantially by the beginning of layer n−2, but some Mg is also observed to enter the titanium dioxide layer 32 (n−2). In the titanium dioxide layer n−2, the Mg is in the range of 10 to 50 counts, as shown in the broken-line frame A, indicating formation of magnesium oxide and titanium monoxide in this layer. Mg becomes less than or equal to 10 counts below layer n−3, indicating that the Mg in this layer may have come from residual Mg in the vacuum chamber 19.

The silicon (Si) of the silicon dioxide of layer n−1 shows a peak around 70 nm from the surface of the OMTFF 30. In layer n−2, the Si count is two orders of magnitude lower. The titanium (Ti) from titanium dioxide in layer n−2 is three orders of magnitude lower in layer n−3. Thus, in each successive layer the main element alternates.

From these results, in the IAD apparatus 10, each material is deposited on the crystal substrate 20 to form a multilayer structure in which each layer has a designated respective thickness. Due to its particular characteristics, Mg enters moderately into the first two underlying layers. As a result, the OMTFF 30 removes incident infrared radiation and also has a top metal film to eliminate charge accumulation.

Figure 4:
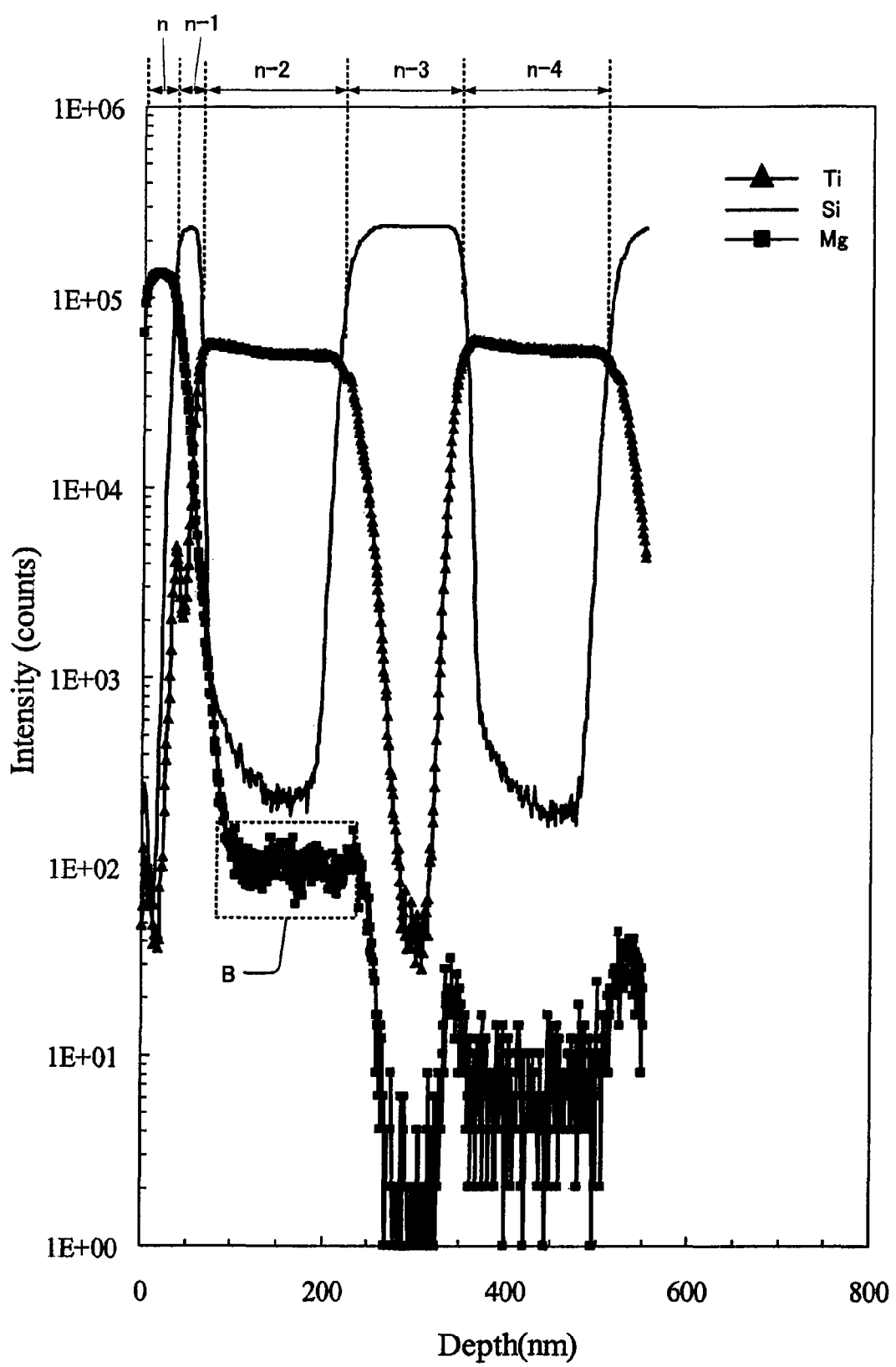
FIG. 4 is a graph of intensity versus depth exhibited by the upper layers of a defective optical multilayer thin-film filter.

FIG. 4 is a graph, similar to FIG. 3, of a defective OMTFF 30 in which excessive Mg has entered the underlying titanium dioxide layer n–2. As indicated in the broken-line frame B, 100 to 200 counts of Mg entered the titanium dioxide (n–2) layer.

In forming the defective OMTFF 30 profiled in FIG. 4, titanium dioxide 32 and silicon dioxide 33 were laminated alternatingly in the first deposition step. The magnesium fluoride 31 layer was laminated in the second deposition step while vacuum conditions in the chamber 19 were maintained (i.e., without an intervening suppression step in which the chamber was temporarily vented to atmosphere). If the second deposition step is performed without any disruption in the vacuum condition, the Mg tends to penetrate more into the titanium dioxide layer without being blocked by moisture that would have been introduced by an intervening suppression step. Although the OMTFF of FIG. 4 can exhibit a charge-eliminating function because more magnesium oxide and titanium monoxide are formed, the metallic composition (making the OMTFF 30 opaque to desired wavelengths of light) is increased. Consequently, this OMTFF cannot function as an infrared-blocking filter.

The ability of an OMTFF to disperse electrical charges can be observed by conducting a simple charge-elimination test on a good-quality OMTFF 30 of this embodiment. The test can be performed by wiping the OMTFF 30 with a wiping cloth to charge the filter with more than 500 V static potential. If, when the surface of the OMTFF 30 is connected to ground, the static charge drops to 0 V, this indicates that the electric charge has been fully removed from the filter. If the same test is conducted on an OMTFF 30 after the first deposition step (without performing a suppression step and before performing the second deposition step), hundreds of volts are observed to remain on the filter 30 even after connecting the filter to ground, indicating that electric charge has not been completely eliminated.

Embodiment 2

Figure 5:
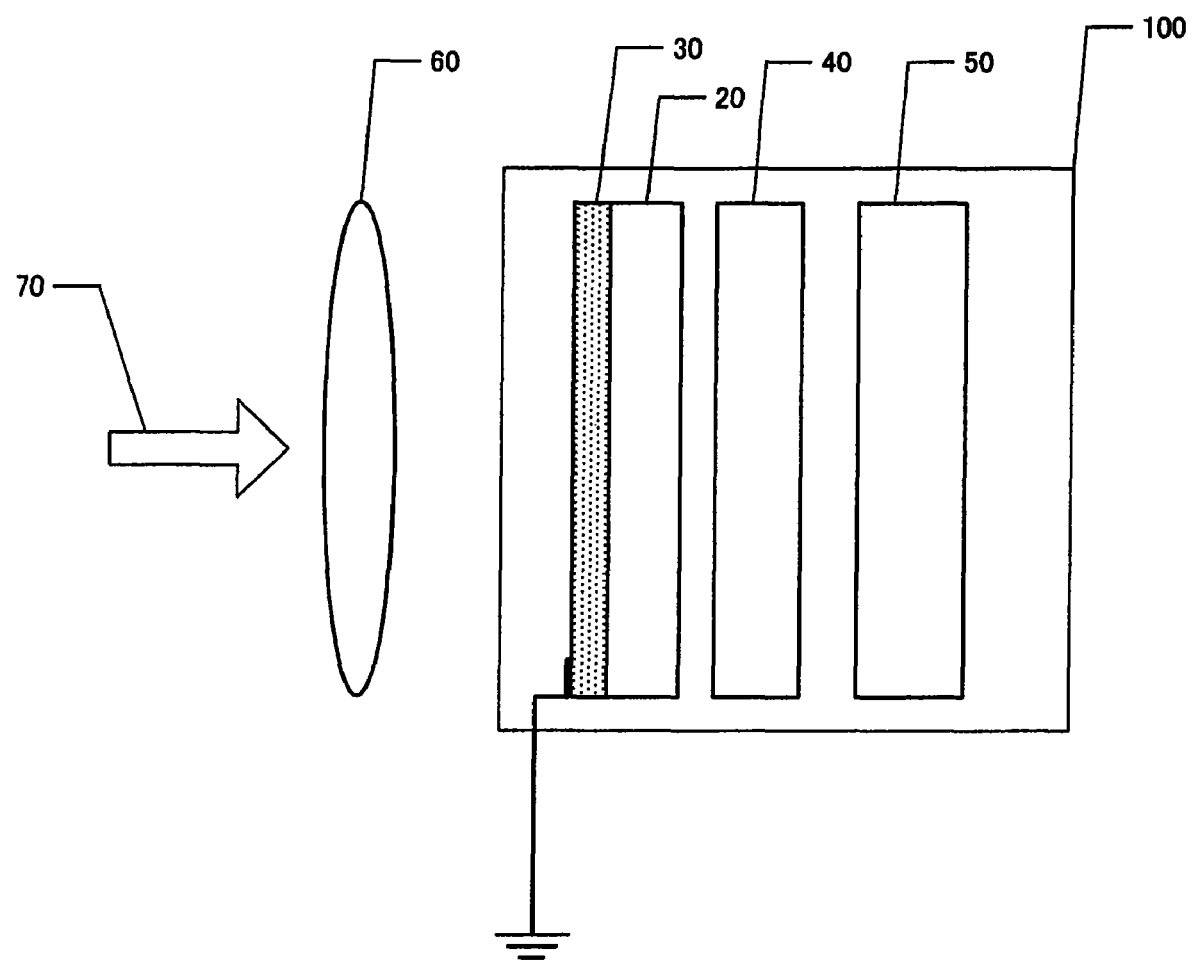
FIG. 5 is an optical diagram of an embodiment of an imaging module of a digital still camera including an optical multilayer thin-film filter.

In this embodiment, the optical multilayer-film filter 30 of Embodiment 1 is utilized in an imaging module 100 of a digital still camera. FIG. 5 is an optical diagram of the imaging module 100. The imaging module 100 comprises a quartz crystal substrate 20 of an optical low-pass filter (OLPF). On the front surface of the optical low-pass filter 20 is the OMTFF 30. Downstream is a solid-state image sensor, such as a CCD sensor or CMOS sensor. A driver 50 provides power and driving signals to the solid-state image sensor 40.

Incident light 70 enters the imaging module 100 through a lens 60. The infrared radiation of the entering light is removed by the OMTFF as the filter transmits visible light and reflects the infrared light. By passage through the crystal substrate 20, which serves as an OLPF, high-frequency components of the light that otherwise would cause moiré patterns are removed. The resulting processed incident light is received and converted to electrical signals by the solid-state image sensor 40. The solid-state image sensor 40 is driven by the driver 50 to deliver electrical signals corresponding to the detected image to an image processor (not shown). The surface of the OMTFF 30 is connected to ground to eliminate static-charge accumulation on the piezoelectric crystal substrate 20.

In various embodiments, the OMTFF 30 is directly deposited on the crystal substrate of the OLPF. Alternatively, the OMTFF 30 can be deposited on another transparent substrate, such as a glass substrate.

In various embodiments, titanium dioxide is used as a high-refractive-index material. Alternatively, other oxides such as tantalum pentoxide or niobium pentoxide, or oxide compounds in which these materials are in major proportion, can be used.

In various embodiments, silicon dioxide is used as a low-refractive-index material. Alternatively, other oxides such as bismuth oxide, or oxide compounds of lanthanum oxide and aluminum oxide, can be used.

In various embodiments, magnesium fluoride is used for the final layer. Alternatively, lithium fluoride can be used. Note that the atomic weight of lithium is 6.941.

What is claimed is:
1. An optical multilayer thin-film filter (OMTFF), comprising:
a substrate that is transparent to at least visible light;
a multilayer film on a surface of the substrate, the multilayer film comprising a plurality of alternatingly laminated thin-film layers of a high-refractive-index material and thin-film layers of a low-refractive-index material; and
an uppermost layer on the multilayer film, the uppermost layer comprising either $MgF_2$ or LiF; wherein
the multilayer film and uppermost layer are collectively transmissive to visible light and collectively reflective to infrared light;
the high refractive-index material and low-refractive-index material are each respective oxides;
an uppermost-but-two (n–2) layer of the multilayer film comprises the high-refractive-index material;
an uppermost-but-one (n–1) layer of the multilayer film comprises the low-refractive-index material;
the uppermost layer is an (n) layer formed on the (n–1) layer;
the successive layers of the high-refractive-index material and of the low-refractive-index material in the multilayer film were formed under vacuum;
the (n) layer was formed under vacuum preceded by a momentary vent to atmosphere to introduce atmospheric water vapor to the multilayer film;
the (n) layer includes at least one oxide of $MgF_2$ or LiF, respectively, resulting from a reaction of $MgF_2$ or LiF, respectively, in the (n) layer with oxygen from at least the (n–1) and (n–2) layers such that at least a portion of the n layer has a predetermined transparency and electrical conductivity; and
the (n–2) layer comprises an amount of Mg or Li, respectively, from the (n) layer that is less than half the amount of Mg or Li, respectively, that otherwise would be present in the (n–2) layer if formation of the (n) layer were not preceded by the momentary vent to atmosphere.
2. The OMTFF of claim 1, wherein:
the high-refractive-index thin-film material comprises at least one oxide selected from the group consisting of $TiO_2$, $Nb_2O_5$, $Ta_2O_5$, compound oxides of $TiO_2$, compound oxides of $Nb_2O_5$, and compound oxides of $Ta_2O_5$; and
the low-refractive-index thin-film material comprises at least one oxide selected from the group consisting of $SiO_2$, $Bi_2O_3$, compound oxides of $La_2O_3$, and compound oxides of $Al_2O_3$.

3. The OMTFF of claim 2, wherein the substrate is fabricated of glass or quartz crystal.

4. The OMTFF of claim 1, wherein the substrate is fabricated of glass or quartz crystal.

5. An imaging optical system, comprising:
an OMTFF as recited in claim 1; and
an image sensor positioned to receive light from the OMTFF.

6. The imaging optical system of claim 5, further comprising an optical low-pass filter disposed between the OMTFF and the image sensor.

7. An optical multilayer thin-film filter (OMTFF) lacking indium tin oxide (ITO), comprising:
a substrate that is transparent to at least visible light;
a multilayer film on a surface of the substrate, the multilayer film comprising multiple layers of a high-refractive-index material alternatingly laminated with multiple layers of a low-refractive-index material, respectively, the high-refractive-index material including a respective oxide, and the low-refractive-index material including a respective oxide; wherein
the multilayer film includes an upper-most layer (n), an uppermost-but-one (n−1) layer, and an uppermost-but-two (n−2) layer;
the n, (n−1), and (n−2) layers are all situated atop the multilayer film;
the (n−2) layer is a thin film of the high-refractive-index material;
the (n−1) layer of the multilayer film is a thin film of the low-refractive-index material; and
the (n) layer comprises $MgF_2$ or LiF.

8. The OMTFF of claim 7, wherein:
the high-refractive-index material comprises at least one oxide selected from the group consisting of $TiO_2$, $Nb_2O_5$, $Ta_2O_5$, compound oxides of $TiO_2$, compound oxides of $Nb_2O_5$, and compound oxides of $Ta_2O_5$; and
the low-refractive-index material comprises at least one oxide selected from the group consisting of $SiO_2$, $Bi_2O_3$, compound oxides of $La_2O_3$, and compound oxides of $Al_2O_3$.

9. The OMTFF of claim 8, wherein the substrate is fabricated of glass or quartz crystal.

10. The OMTFF of claim 9, wherein:
the $MgF_2$ or LiF in the (n) layer is reactive to oxygen in the high-refractive-index material and reactive to oxygen in the low-refractive-index material; and
at least a portion of the (n) layer comprises metal-oxide film formed by reaction of Mg or Li, respectively, with the oxygen, the metal-oxide film having a predetermined transparency.

11. The OMTFF of claim 7, wherein the substrate is fabricated of glass or quartz crystal.

12. The OMTFF of claim 11, wherein:
the $MgF_2$ or LiF in the (n) layer is reactive to oxygen in the high-refractive-index material and reactive to oxygen in the low-refractive-index material; and
at least a portion of the (n) layer comprises metal-oxide film formed by reaction of Mg or Li, respectively, with the oxygen, the metal-oxide film having a predetermined transparency.

13. The OMTFF of claim 7, wherein:
the $MgF_2$ or LiF in the (n) layer is reactive to oxygen in the high-refractive-index material and reactive to oxygen in the low-refractive-index material; and
at least a portion of the (n) layer comprises metal-oxide film formed by reaction of Mg or Li, respectively, with the oxygen, the metal-oxide film having a predetermined transparency.

14. The OMTFF of claim 8, wherein:
the $MgF_2$ or LiF in the (n) layer is reactive to oxygen in the high-refractive-index material and reactive to oxygen in the low-refractive-index material; and
at least a portion of the (n) layer comprises metal-oxide film formed by reaction of Mg or Li, respectively, with the oxygen, the metal-oxide film having a predetermined transparency.

15. The OMTFF of claim 7, wherein the (n) layer is a charge conductor compared to the low-refractive-index layers or high-refractive-index layers.

16. An imaging optical system, comprising:
an OMTFF as recited in claim 7; and
an image sensor positioned to receive light from the OMTFF.

17. The imaging optical system of claim 16, further comprising an optical low-pass filter disposed between the OMTFF and the image sensor.

* * * * *